Feb. 5, 1935.  A. J. MASON  1,990,296
METHOD OF OPERATING A REDUCING FURNACE
Filed Feb. 17, 1933
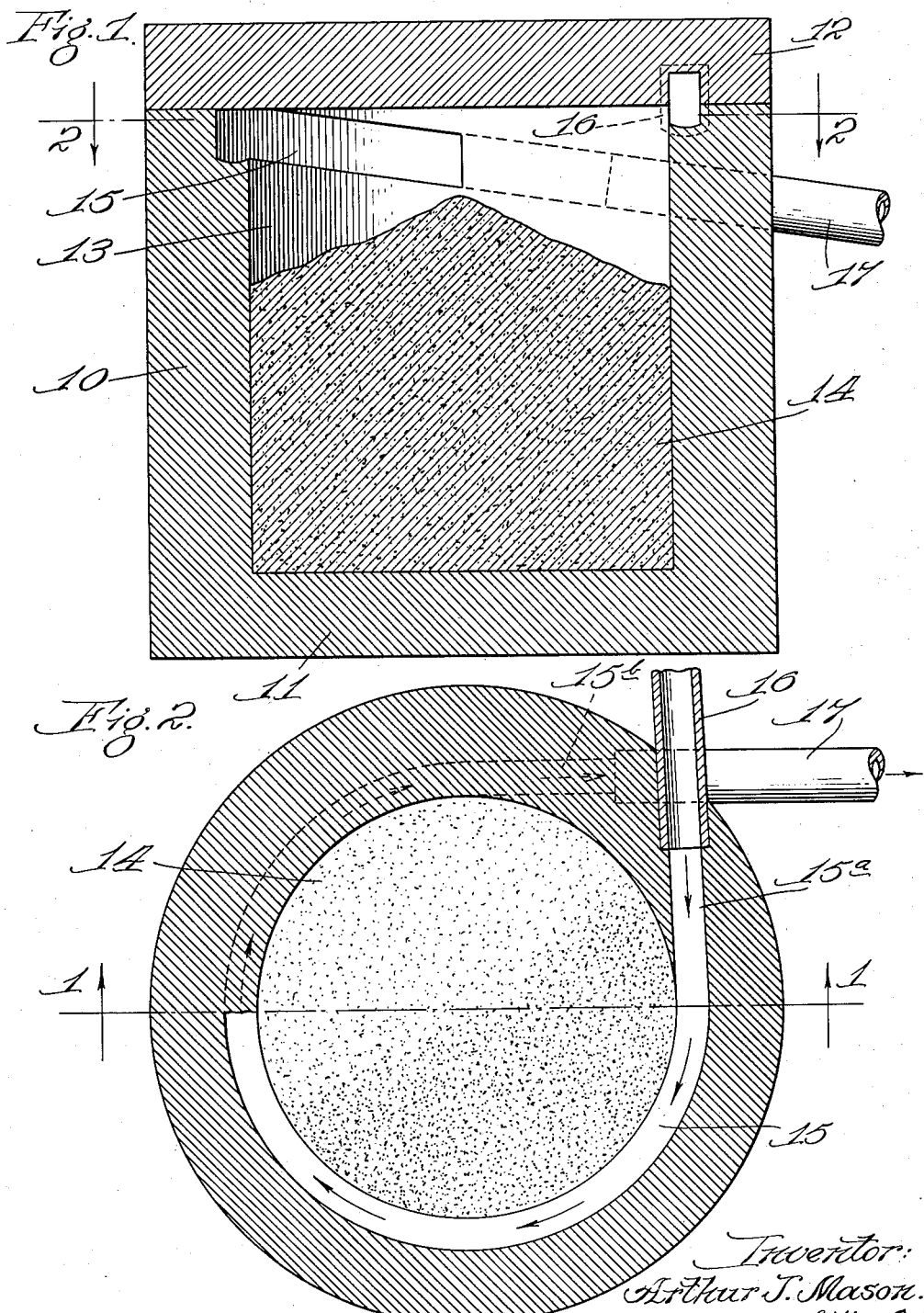

Patented Feb. 5, 1935

1,990,296

UNITED STATES PATENT OFFICE 1,990,296

METHOD OF OPERATING A REDUCING FURNACE

Arthur J. Mason, Homewood, Ill.; Continental Illinois National Bank and Trust Company of Chicago executor of said Arthur J. Mason, deceased Application February 17, 1933, Serial No. 657,291

3 Claims. (Cl. 75—17)

This invention relates to improvements in furnaces and method of operating the same and of reducing. The invention relates more particularly to a furnace providing a reducing heat.

By the use of my invention I have made a new furnace and also developed a new process or method for operating the same and for reducing material under heat. By the use of my invention, I am able to provide a high temperature and a highly reducing atmosphere in a very economical manner.

Other features and advantages of my invention will appear more fully as I proceed with my specification.

In the accompanying drawing, I have shown a furnace embodying the features of my invention and adapted for carrying out my improved process or method.

In such drawing—

Figure 1 is a vertical sectional view, taken as indicated by the line 1 of Fig. 2; and Fig. 2 is a horizontal sectional view taken as indicated by the line 2 of Fig. 1.

As shown in the drawing, the furnace may include a cylindrical wall 10 made of suitable refractory material with a bottom 11 and top 12 made of similar material. 13 indicates the interior of the furnace or fire box in which is placed the material 14 to be heated and reduced. This material has mixed with it some suitable substance for furnishing carbon, such as, for example, coke or coal.

15 indicates an annular spiral gutter-like groove in the inner wall of the furnace, the upper end thereof, as indicated by 15$^a$, connecting with an inlet pipe 16 and the lower end thereof 15$^b$ issuing into an outlet or discharge pipe 17. The fuel, for example, powdered coal, gas, oil, or the like, mixed with a suitable amount of air, enters through the pipe 16. In operation, it is to be understood that the furnace is brought up to heat in some suitable manner so that the fuel, as it enters the hot furnace, is ignited. The velocity of the entering fuel may be sufficient so that the combustion will not go back into the inlet pipe 16 to any undesirable extent. The burning fuel follows around in the channel 15 and the products of combustion pass out through the pipe 17. The downward spiral permits any slag formed from coal or melted ash to follow with the burning fuel and products of combustion and find an exit from the furnace through the pipe 17. It is to be noted that the pipes 16 and 17 are oppositely tangentially directed to facilitate the rotary motion of the burning fuel and products of combustion in the furnace, as indicated by the arrows.

I have found that in operation, the fuel with a suitable admixture of air is preferably caused to enter at a high velocity, for example, from 3000 to 15000 linear feet a minute, depending upon the diameter of the furnace.

In operation, the heat from the combustion of the fuel is sufficient to reduce the material in the furnace. A great part of this heat naturally is radiant heat received from the walls of the furnace which ordinarily are heated to radiance. The carbon mixed with the material to be reduced causes a formation of carbon monoxide in the central zone of the furnace. The centrifugal force produced by the rotary motion of the burning fuel lessens or prevents a mixture of the carbon dioxide in the products of fuel combustion with the carbon monoxide in the central zone of the furnace. Carbon dioxide being much heavier than carbon monoxide causes the former to follow the exterior walls while the lighter carbon monoxide is permitted to collect in the central zone and is largely retained within that zone, constantly revolving, in the form of an eddy, but at a very high temperature. In this manner, I succeed in burning the fuel economically, achieve a very high furnace temperature, and still retain within the central zone an atmosphere in which carbon monoxide predominates over carbon dioxide. For example, I succeed in keeping the proportion of these gases as high as approximately 9 to 1, provided a proper amount of carbon is furnished within the central zone with the material to be reduced.

Also, any carbon monoxide occurring in the products of combustion is more or less separated out from the carbon dioxide by centrifugal force so that such carbon monoxide is concentrated toward the central zone of the furnace to assist in the reducing action whereas the carbon dioxide will pass out through the pipe 17.

It will be observed that the highly reducing atmosphere remains constantly within the furnace and needs but a relatively small amount of carbon within its zone. That is, by the practice of my invention, the escape or leakage of the carbon monoxide is not nearly as rapid as it would be if the products of combustion mixed with it and were not separated therefrom by the centrifugal action described above. My invention may be employed, for example, in annealing furnace, a furnace for treating metal to avoid scale before forging, for treating phosphate rock to disassociate the phosphorus, for treating iron ore to make sponge iron, and the like.

I have found that by the use of my invention, substantially most operations which are now commonly performed in an electric furnace providing a high temperature and a highly reducing atmosphere may be accomplished in a furnace not using electricity for heat and in a more economical manner.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I regard as new, and desire to secure by Letters Patent, is:

1. The method of reducing by heat in a furnace, consisting of mixing carbon with the material to be reduced, heating the same with burning fuel caused to revolve above and adjacent the bed of material, said burning fuel being maintained substantially separate from said bed, and maintaining the burning gases in a whirling state to produce by centrifugal force a relatively high concentration of carbon monoxide in the central zone of the furnace.

2. The method of reducing by heat in a furnace, consisting of mixing carbon with the material to be reduced, heating the same with burning fuel to produce carbon monoxide from the carbon mixed with the material, causing the burning gases to revolve above and adjacent the bed of material, and maintaining the burning gases in a whirling state to produce by centrifugal force a relatively high concentration of carbon monoxide gas in the central zone of the furnace.

3. The method of operating a reducing furnace heated with burning gases, including the step of introducing the burning gases tangentially at a relatively high velocity above and adjacent the bed of material, maintaining the burning gases substantially separate from said bed, and maintaining the burning gases in a whirling state to produce by centrifugal force a relatively high concentration of carbon monoxide gas in the central portion of said whirling gases.

ARTHUR J. MASON.